Jan. 21, 1930.  F. G. JACOBS ET AL  1,744,637
ELASTIC FRICTION CLUTCH
Filed May 15, 1925
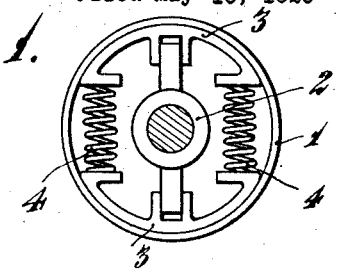
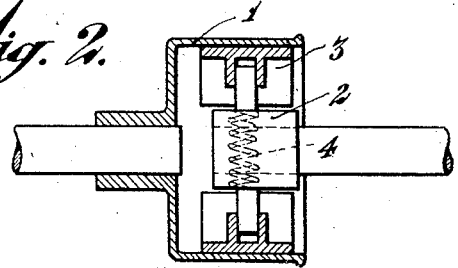
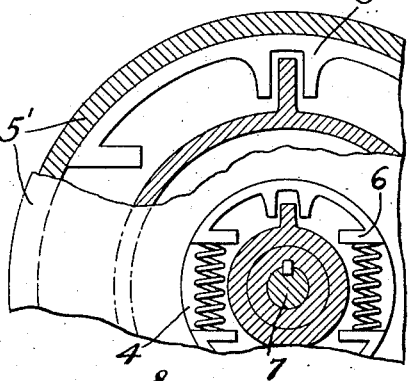
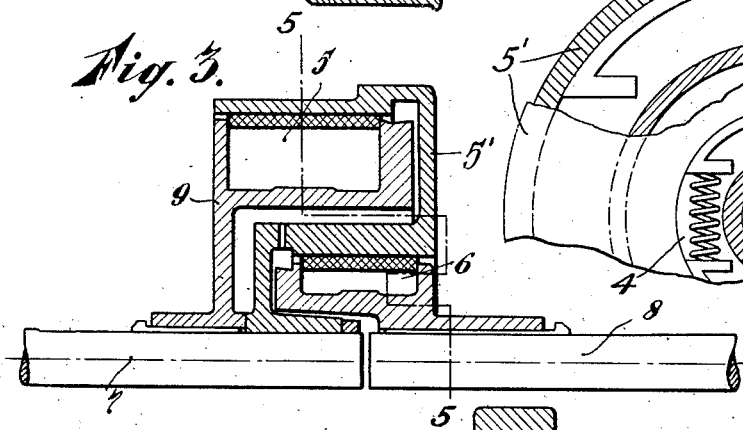
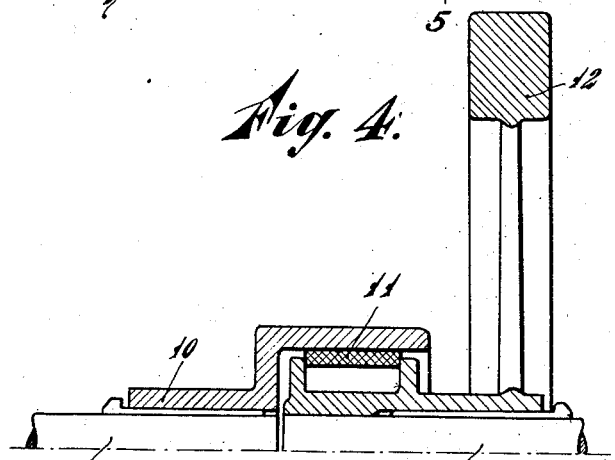
Inventors
F. G. Jacobs
J. M. M. Schmitz
by Langner, Parry, Card & Langner
Attys.

Patented Jan. 21, 1930

1,744,637

UNITED STATES PATENT OFFICE

FRANCISCUS GERARDUS JACOBS, OF ROTTERDAM, AND JOHAN MARTINUS MARIA SCHMITZ, OF HILLEGERSBERG, NEAR ROTTERDAM, NETHERLANDS

ELASTIC FRICTION CLUTCH

Application filed May 15, 1925, Serial No. 30,586, and in the Netherlands January 12, 1925.

From the Dutch Patent Nr. 2,236 cl. 47 c. 13 a disengageable friction clutch is known in which the friction blocks are pressed down by centrifugal force and by spring pressure acting in the same direction and in which the part bearing the friction blocks is arranged on the driven shaft and the other part on the driving shaft.

This clutch has various drawbacks. In the first place this clutch cannot rotate in either direction, because when rotating in one of the two directions it acts as a ratchet and pawl device. Furthermore it has appeared in practice that in the same installation it does not always yield the same H. P. Moreover, in case of an overloading by the driven tools the rotation speed of the engine and clutch with the driven shaft and tools is retarded. Furthermore in disengaged position the spring pressure is greater than in engaged position.

The invention relates to a clutch device of the above described type which does not have these drawbacks, which fully automatically engages and disengages and which moreover restricts the transmission of shocks and the influence of the inertia effect, between certain limits.

According to the invention the capacity is restricted between a minimum and a maximum couple in which the minimum couple is caused by spring pressure or by elasticity, and the maximum couple by spring pressure or elasticity augmented by the pressure caused by the centrifugal force of the friction blocks or of special masses.

According to the invention the friction blocks may further be so arranged that by the increase or decrease of the centrifugal force they are radially moved.

Furthermore the invention enables the clutch to be combined with an ordinary centrifugal clutch in order to start under load a motor without starting moment, for instance a combustion engine or a monophase alternating current motor.

Finally the invention enables the clutch to be combined with a fly wheel arranged on the driven shaft.

Some embodiments of the invention will now be further explained with reference to the accompanying drawings.

The Figs. 1 and 2 respectively are a diagrammatical cross-section and longitudinal section of the clutch according to the invention.

Fig. 3 is a longitudinal section of the combination with a centrifugal clutch for starting a motor without starting moment, certain details of construction being omitted.

Fig. 4 is a longitudinal section of the combination with a fly wheel arranged on the driven shaft.

Fig. 5 is a cross section taken along the line 5—5 of Fig. 3.

In the Figs. 1 and 2, 1 is the driving drum which is connected with the motor. The driven part of the clutch consists of the yoke 2 with the friction blocks 3. These blocks 3 are permanently pressed against the drum 1 by springs 4 which are arranged in suitable places. These springs 4 cause the starting moment which must so be chosen that when rotating the driving part, the driven part will also rotate.

If the driven part is rotating the blocks 3 or special masses intended for this will cause centrifugal force.

By the reciprocal action between the increase of the couple and the increase of the number of revolutions the motor is started without any shocks by which the influence of the inertia effect is restricted to the same amount as the couple of the elastic clutch. In case of shocks on the side of the driven part the retardations and accelerations caused by this and also the inertia effect on the source of energy during working which is a consequence of this, as well as the torsional oscillations and vibrations are restricted between certain limits namely the largest couple on the one side and the starting moment on the other side.

Within these limits the couple is always redressed automatically. If the resistance of the driven part becomes as large or larger than the largest couple, in which case without the clutch of the invention an overloading of the engine might arise, the couple can only redress itself after decrease of the resistance.

to a value within the admissible limit. During the time in which the value of the resistance is above this limit the value of the couple is at the utmost equal to that of the starting moment.

The springs 4 must be so arranged that they move the blocks 3 radially.

Experiments have proved that the application of a clutch constructed according to the invention will cause considerable saving in comparison with the clutch such as is described in the above mentioned Dutch Patent Nr. 2,236 and still more with regard to other clutches.

By means of the clutch according to the invention it is possible to start under load a motor without starting moment, for example a combustion motor or a monophase alternating current motor even under full load. This is done by combination with an ordinary centrifugal clutch.

An embodiment of this is given in Fig. 3 in section. In this figure, 7 is the driving shaft and 8 the driven tool. The driving shaft 7 is provided with a casing 9 keyed to shaft 7, and in which an ordinary centrifugal clutch 5, including a casing 5' loose on shaft 7, and connectible thereto by centrifugal clutch action, is arranged. This casing 5' cooperates with a clutch 6 constructed according to the invention as described in connection with Figs. 1 and 2 and which clutch 6 in its turn starts the driven tool 8. The principal consequence of the application of this combination is that a certain percentage of the turning couple is obtained only at a higher number of revolutions per minute than if no clutch 5 were used.

In order to extend the limits between the minimum and the maximum couple a fly wheel may be arranged on the driven shaft. Such a fly wheel may also be employed for utilizing the kinetic energy obtained between the minimum and the maximum couple for obtaining or increasing kinetic energy without the supply of power exceeding the maximum couple.

In Fig. 4 a longitudinal section of an embodiment is given in which a fly wheel is arranged on the driven shaft. In this figure, 7 is the driving shaft and 8 the driven shaft. On the driving shaft 7 the casing or drum 10 of a clutch as in Figs. 1 and 2 is keyed. In casing 10 is located a clutch constructed according to Figs. 1 and 2, and in addition a fly wheel 12 is arranged on the driven shaft 8.

Such a device may for instance be applied with a source of power with a high full load couple. Under ordinary circumstances the source of power cannot yield the highest couple without soon occurring damages such as melting of fuses. The application of the device according to Fig. 4 now enables one to load the source of power intermittingly with the highest couple. The couple decreases during the use of the kinetic energy of the fly wheel, so that finally the fly wheel rotates independently of the driving shaft without the supply of power exceeding the maximum couple.

We claim:

1. In an automatic clutch, the combination with driving and driven parts of clutch elements, including a coupling member freely rotatable on said driving part, radially movable members on said driven part, a spring for maintaining normal engagement between said coupling and radially movable members, the pressure of said spring being augmented by centrifugal force when said driven part picks up rotation through the spring frictional engagement between said coupling and radially movable members and a centrifugally movable clutch element fixed to said driving part and engageable with said coupling member.

2. In a clutch, driving and driven parts, a coupling member rotatably mounted on the driving part and having two offset portions providing two substantially concentric rings, radially slidable members mounted on the driven part, springs normally holding said slidable members in contact with the inner surface of the innermost ring, a second coupling member mounted fast on the driving part to rotate therewith, and equipped with clutch means operable to be moved into contact with the under surface of said outer concentric ring.

In testimony whereof we affix our signatures.

JOHAN MARTINUS MARIA SCHMITZ.
FRANCISCUS GERARDUS JACOBS.